Nov. 7, 1967  F. J. HAJICEK  3,351,878

TRANSFORMER WITH AUXILIARY REACTOR WINDING

Filed Oct. 22, 1965

INVENTOR.
FRANK J. HAJICEK
BY Frederick C. Lange
ATTORNEY

3,351,878

TRANSFORMER WITH AUXILIARY REACTOR WINDING

Frank J. Hajicek, St. Paul, Minn., assignor to Marquette Corporation, Minneapolis, Minn., a corporation of Delaware
Filed Oct. 22, 1965, Ser. No. 501,803
6 Claims. (Cl. 336—155)

ABSTRACT OF THE DISCLOSURE

A transformer, particularly suitable for use in welding in which the core has a stub portion projecting outwardly therefrom on which is located one or more reactor coils connected in series with the secondary winding and the output terminals.

In many applications, such as welding, the impedance across the load changes abruptly. Referring specifically to the welding art, it is necessary to have a relatively high voltage to initially break down the welding gap. As soon as an arc has been struck, however, the impedance across the welding gap drops very abruptly. It is thus desirable to have a source of supply which has a relatively high initial output voltage and wherein the voltage actually applied to the gap drops materially as current is drawn. One way in which this is done is to employ a transformer with "poor voltage regulation." With such a transformer, the output voltage drops substantially as the current drawn increases. One way of providing such a drooping characteristic is to provide a leakage transformer. Where it is desired to vary the current, the leakage path in the transformer is changed so as to change the droop in the secondary voltage when the transformer is loaded. The drawback of this is that it tends to reduce the open circuit voltage somewhat and it is desirable, in order to insure that the welding gap always breaks down, to maintain the open circuit voltage unchanged. Another method which has been proposed for accomplishing this is to provide a transformer with an adjustable reactance in series with the secondary winding. One way which has been proposed to vary this reactance is to have a movable core associated with the reactance so as to vary its inductive impedance. While this results in a very satisfactory arrangement useful for very large welding transformers, it has the drawback that it requires a relatively involved core structure for the reactor and a relatively elaborate mechanism to actuate the reactor core and to maintain it against vibration.

An object of the present invention is to provide a transformer of the type having a reactor coil in series with the output thereof and which is relatively simple in construction.

A further object of the present invention is to provide such a transformer in which the reactance coil exerts its primary effect by mutual coupling with the secondary winding, and to some extent with the primary winding, to increase the reactance effect of the reactor winding so as to decrease the total output voltage.

Specifically, I accomplish this by providing a core having a stub portion extending beyond the main magnetic loop upon which the primary and secondary windings are located and in locating the reactor coil on this extending stub portion and connecting it the secondary coil in such a manner that the mutual coupling between the reactor coil and the primary and secondary windings increases the impedance effect of the reactor coil. In order to vary the current, varying portions of this reactor coil may be connected in series with the secondary by providing suitable taps on the reactor coil.

I also provide an auxiliary reactor coil which is wound on the same projecting portion as the main reactor coil and which likewise is provided with various taps. In order to vary the open circuit voltage, it is also contemplated that the secondary winding may be tapped at various points.

Other objects of the invention will be apparent from a consideration of the accompanying specification, claims and drawing of which:

Figure 1:
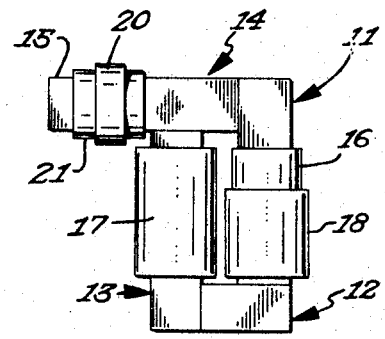
FIGURE 1 is a plan view of my welding transformer showing merely the windings and the core structure.

Referring specifically to the drawing, the transformer core is shown as composed of a plurality of I-shaped sections 11, 12, 13 and 14. It will be noted that sections 11 and 13 are of substantially equal length. If the sections 12 and 14 were equal in length to each other, the resulting core would be a rectangular core. Section 14 is, however, substantially greater in length than section 12 to provide a stub portion extending to the left of the main magnetic structure, this portion being designated by the reference numeral 15. Each of the sections 11, 12, 13 and 14 may be formed of laminated magnetic material such as silicon steel. The various sections are welded to each other to form a continuous magnetic unit. Located on the section 11 is the primary winding 16. A secondary winding 17 is located on the core section 13. Also located on the core section 11 is an auxiliary secondary winding 18 which, being located on the same leg as the primary winding 16, is very closely coupled therewith. Reactor windings 20 and 21 are both located upon the portion 15 of the leg 14 extending beyond the magnetic loop formed by bars 11, 12, 13 and 14. The manner in which the various coils 16, 17, 18, 20 and 21 are interconnected with each other and to the power supply and the load will be described in connection with FIGURE 2.

Figure 2:
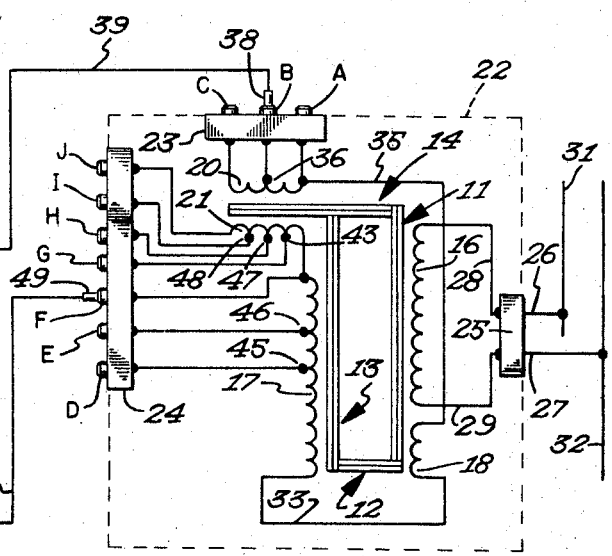
FIGURE 2 is a schematic view showing the various means for tapping the different windings, for connecting them to a power supply and for connecting them to a welding load circuit.

Referring to FIGURE 2, I have shown the core sections 11, 12, 13 and 14 and the windings 16, 17, 18, 20 and 21 in schematic form. The transformer is shown as located within a housing 22 shown in dotted lines. Secured to the wall of the housing are a plurality of terminal blocks 23, 24 and 25.

Referring first to primary winding 16, it will be noted that the opposite ends of this primary winding are connected through conductors 28 and 29 to the terminals of terminal block 25, which terminals are, in turn, connected through conductors 26 and 27 to any suitable source of alternating power, such as line wires 31 and 32. One terminal of the secondary winding 17 is connected through a conductor 33 to the lower terminal of the auxiliary secondary winding 18. Since secondary winding 18 is located on the same leg of the core as primary winding 16, it is obvious that auxiliary secondary winding 18 will be very closely coupled magnetically with the primary winding 16 so that the voltage output of the auxiliary winding 18 will remain relatively constant. Such an auxiliary secondary winding is often referred to as a "teaser" or closely coupled secondary. The function of it is to insure that the secondary voltage does not drop excessively as current is drawn.

The upper terminal of the auxiliary secondary winding 18 is connected through a conductor 35 to the right-hand terminal of the reactor winding 20, reactor winding 20 thus being connected in series with the main secondary winding 17 and the auxiliary secondary winding 18. The reactor winding 20 has its opposite ends connected to two terminals of terminal block 23, designated by the reference numerals A and C. The reactor has a center tap 36 which is connected to an intermediate terminal B on connector block 23. The terminals A, B and C are in the form of plug sockets connected to reactor coil 20 and are adapted to have one of the output load conductors connected to any one of these terminals to function as one of the output terminals of the secondary winding. I have shown a terminal plug 38 connected to a conductor 39 as being plugged into terminal socket B of the connector block 23. It will be obvious that when terminal plug 38 is connected in the terminal B, the right-hand portion of reactor winding 20 is included in the output circuit. When the same terminal is connected in the socket A, the reactor winding 20 is included in no way in the output circuit and when the terminal plug 38 is connected to terminal C, the entire reactor winding is connected into the circuit. The conductor 39 is preferably a suitably insulated conductor. The opposite end of it is shown as extending to a welding electrode handle 40 to which is secured a welding electrode 41 held in position adjacent the piece of work 42 which it is desired to weld.

Turning to the other output terminals of the transformer, the terminal block 24 is provided with plug receptacle terminals D, E, F, G, H, I and J. The terminals D, E and F are connected respectively to taps 45 and 46 and to the upper terminal of secondary 17. The terminals G, H and I are connected to taps 43, 47, and 48, respectively, of reactor winding 21 whereas the connector J is connected to the left-hand terminal of reactor winding 21. I have shown a terminal plug 49 as being plugged into terminal F. This plug is connected to an insulator conductor 50 which in turn leads to a terminal clamp 51 secured to the work piece 42.

Where the terminal plug 49 is plugged into the terminal F, the load circuit comprises the full secondary 17 but none of the reactor 21. If it were connected into the connector D, for example, a portion of the secondary winding above tap 45 would not be included in the load circuit so that the total open circuit voltage would be lower. By selecting taps D, E or F in which to plug the terminal plug 49, the open circuit voltage can be changed. If the plug 49 is connected into connector G, for example, the entire secondary winding 17 is included in the load circuit along with the portion of the reactor winding 21 to the right of tap 43. Similarly, when the plug 49 is connected into terminal H, the portion of reactor winding 21 to the right of tap 47, along with the entire secondary winding 17, is included in the circuit. When the plug 49 is connected into terminal J, the entire reactor winding 21 is connected in series with the secondary winding.

*Operation*

With the terminal plug 38 of conductor 39 connected into terminal B and with the terminal plug 49 connected into connector F, for example, current can flow from the lower terminal of secondary 17 through conductor 33, auxiliary secondary winding 18, conductor 35, the right half of reactor winding 20, terminal B, connector 38, conductor 39, electrode holder 40, welding electrode 41, work piece 42, terminal clamp 51, connector 50, terminal plug 49, and terminal F to the upper terminal of secondary winding 17. The open circuit voltage applied to the welding gap under these conditions is the full secondary voltage. The output current flows through the right half of reactor winding 20. As soon as the welding arc breaks down so that current does flow through this circuit, a very large current passes through the right-hand side of reactor winding 20 to produce flux in the element 14 of the transformer core. Even though the reactor winding 20 is located outside of the magnetic loop formed by elements 11, 12, 13 and 14, the flux produced by winding 20 will pass into a portion of leg 14 included in the magnetic loop. Some of the same flux will also enter the upper portion of leg 13. In other words, the left-hand upper corner of the magnetic loop will have flux induced therein. The winding 20 is so connected with the secondary winding 17 that considering the magnetic circuit including core section 13 and extending portion 15 of core section 14, the flux produced by winding 20 is in the same direction as that produced by secondary winding 17. Thus, there is mutual inductance between coils 17 and 20 tending to increase the reactance of winding 20. Similarly, while the extending portion 15 of core section 14 is not in the same magnetic circuit as primary winding 16, there is a magnetic circuit including the core section 11 and core section 14 which includes both the primary winding 16 and the reactor winding 20. Again, considering this magnetic circuit, any flux produced by primary winding 16 which tends to enter the extending portion 15 is in the same direction as the flux produced by reactor winding 20. Again, there is a mutual coupling between winding 20 and primary winding 16. The latter effect, that is flux produced by primary winding 16 entering the projecting portion 15 of section 14, is not appreciably present until a heavy load is drawn from the secondary 17. When this happens, some flux produced by the primary winding 16 does enter the projecting portion 15 and returns by the long air gap between the left-hand end of projecting portion 15 and the lower portion of core section 13. The net effect of the mutual coupling between winding 20 and secondary winding 17 and, under the conditions described, between winding 20 and primary winding 16 is to greatly increase the reactive effect of reactor coil 20.

It will readily be apparent that where terminal plug 38 is connected into terminal A, the reactor winding is completely out of the circuit and has no effect since no current flows therethrough. It will also be apparent that if the same plug is connected into terminal C, the reactor winding will be fully in the circuit and have its maximum effect.

Turning to the other load conductor 50, when its terminal plug 49 is connected into terminal D, the open circuit voltage is at its lowest value, as pointed out above. When terminal plug 49 is connected into terminal J, all of the secondary winding and all of the reactor winding 21 are connected into the circuit so that if terminal plug 38 is connected into terminal C, both reactor windings 20 and 21 are fully in the circuit. The reactor winding 21 has an effect which is similar to that of reactor winding 20 and operates in the same way. Where winding 21 has more turns than reactor winding 20, it can be used to produce substantial changes in the load current while winding 20 is used to produce smaller changes in the load current.

Figure 3:
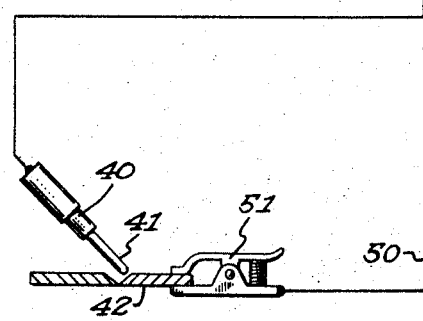
FIGURE 3 is a graphical representation of the relationship between output voltage and current with various connections of the load circuit to different taps of the transformer.
Figure 3:
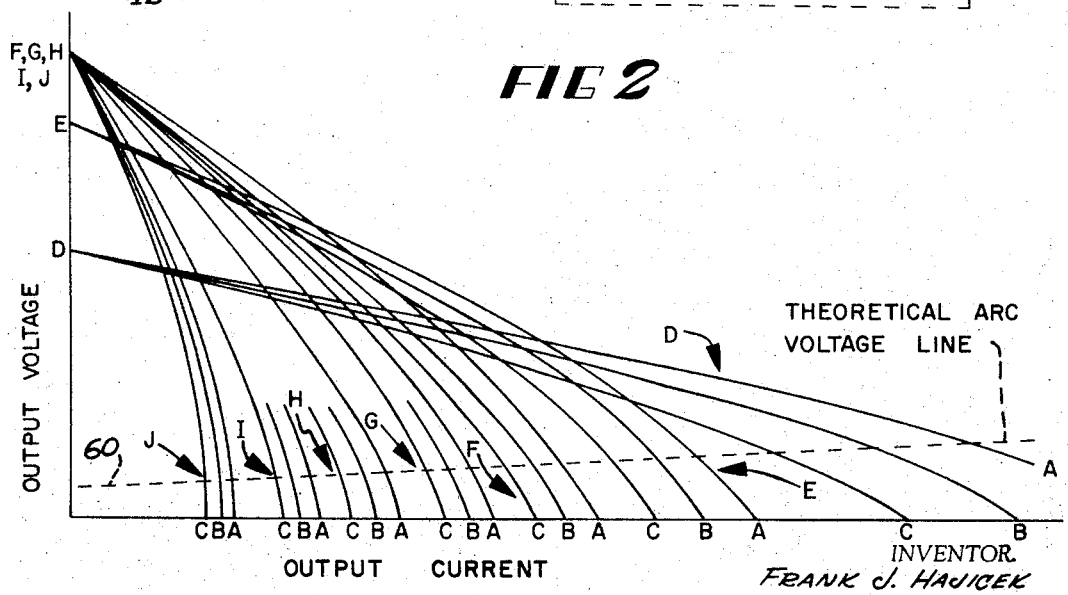

It will readily be apparent that by reason of the various taps A, B, C, D, E, F, G, H, I and J, various combinations of open circuit voltage and various amounts of "droop" can be obtained. In FIGURE 3, I have shown graphically the various combinations of voltage with current that can be produced by the different connections. Referring to this figure, the various output currents are indicated along the abscissa line and the output voltages along the ordinate line. Turning to the ordinate line, it will be noted that there are three points along the line from which voltage-current lines start. One of these is the point D, the other the point E and the other the point F, G, H, I and J. Since the ordinate line represents the point of zero current, these voltages are the open circuit voltages and, as pointed out above, the open circuit voltage is reduced by connecting the terminal 49 into either connectors D and E but is at its maximum value when the connector is plugged into either terminals F, G, H, I and J. Consequently, the curves involving connections F, G, H, I and J all start from the same point along the ordinate line.

Considering first the conditions existing with the terminal plugs connected as shown in FIGURE 2, that is, with one terminal plug connected into terminal B and the other connected into terminal F, it is necessary to consider the intermediate curve of the group of curves designated by the reference numeral F, this curve being the curve resulting when the connector 38 is connected into terminal B and the connector 49 is connected into the terminal F. It will be noted that there is a very pronounced drop in voltage as the current increases. The curve immediately to the right of this curve is the curve obtained when the connector 49 is still connected in connector F but the connector 38 is connected into connector A. Under these conditions, the effect of reactance 20 is eliminated and the droop is merely due to the natural droop in the transformer as the current increases. If, on the other hand, the plug 38 is connected into connector C, it will be noted that the drop in current is even greater than when it is connected into connector B.

When the plug 49 is connected into terminal G instead of terminal F, the voltage-current curves will be those designated by the reference numeral G in FIGURE 3. Again, there are three curves depending upon whether plug 38 is connected into terminal A, terminal B or terminal C. Similarly, if plug 39 is connected into terminal J, the curves on the extreme left-hand side of FIGURE 3 designated by the reference J will result. It will be noted that in this case, the maximum amount of droop results. This is due to the fact that the entire reactor winding 21 is connected in series with the secondary. If plug 49 is connected into either terminal H or I, the intermediate groups of curves H or I will result.

If plug 49 is connected into terminals D or E, the open circuit voltage will be reduced since the complete secondary winding will no longer be in the load circuit. This is indicated by the set of curves terminating at points D and E along the output voltage line. Again, with each point of connection, there are three voltage-current lines depending upon whether plug 38 is connected into connector terminal A, B or C.

While winding 21 is shown as having the same number of turns as reactor winding 20, in actual practice, reactor winding 21 has substantially more turns than reactor winding 20. This is illustrated by the fact that the lines A, B and C of the group of curves F, for example, are spaced more closely together than curve A in group F is from curve A in group G. In other words, by moving the terminal plug 49 from connection F to connection G, a greater effect is produced than by moving plug 38 from terminal A to terminal B.

Referring further to FIGURE 3, the significant voltage during operation is the voltage determined by the intersection of any one voltage and current curve with the arc voltage line 60. This line is the line showing the voltage across the arc gap for any given current. This voltage will, of course, vary with different welding electrodes and with different welding conditions. Assuming, however, the same welding conditions and the same electrode, a line can be drawn, such as line 60, showing the relationship between the current flowing through the arc and the voltage across the arc. It is this voltage which is of significance in determining the effect of the reactor windings 20 and 21. It will be noted, for example, that when plug 49 is connected to terminal D, and plug 38 is connected to terminal A, the voltage maintained across the arc and the current flowing through it will be at their maximum value among the various examples given, even though the open circuit voltage is relatively low. As more and more of the reactor windings 20 and 21 are connected into the circuit, the welding current will drop. It is thus possible by suitably selecting the terminals into which plugs 38 and 49 are connected to obtain varying desired open circuit voltages and operating currents over a very wide range. This is done by an extremely simple arrangement involving no moving parts other than the terminal plugs.

While the invention is in no way to be limited to any particular values, in one particular example, the primary voltage was 230 volts with a maximum secondary current of 235 amperes. In this embodiment, the primary winding employed 149 turns, the auxiliary secondary winding 14 turns, the main secondary winding 17, 20 turns up to tap 45, 32 turns up to tap E and 40 turns up to tap F. In other words, the main portion of the secondary winding had 40 turns. In winding 20, eight turns were employed. In winding 21, 9 turns were employed between the right-hand terminal and tap 43, nine turns between taps 43 and 47, 12 turns between taps 47 and 48, and 16 turns between tap 48 and the left-hand terminal of the winding. In this embodiment, it was possible by suitable selection of the terminals to which the various terminal plugs were connected, to obtain a variation in welding current from 40 amperes to 235 amperes.

While I have shown a specific embodiment of my invention for purposes of illustration, it is to be understood that the scope of the invention is limited solely by the appended claims.

I claim as my invention:

1. A transformer having a
   transformer core including a first portion forming a magnetic loop and an additional stub portion projecting from and constituting a continuous magnetic extension of said first portion but disposed outside of the magnetic loop formed by said first portion, said stub portion having the free end thereof substantially spaced magnetically from said first portion,
   primary and secondary windings disposed on said first portion of said core and electromagnetically coupled with each other through said core,
   and a reactor winding disposed on said additional portion and connected in series with said secondary winding in such a direction that the flux produced in said stub portion by the reactor winding is in the same direction as the flux produced by said secondary winding and entering said stub portion,
   said reactor winding normally having substantially no voltage induced therein by reason of being disposed outside of said magnetic loop but being effective by reason of the mutual coupling between said reactor winding and secondary winding to reduce substantially the over-all output voltage when current flows therethrough.

2. The transformer of claim 1 in which said reactor winding has a plurality of taps to which an output conductor can be selectively connected.

3. The transformer of claim 1 in which there are two such reactor windings disposed on said additional portion of said core, each of said reactor windings being connected in series with said secondary winding but to opposite ends thereof, and both being connected to said secondary winding in such a direction that the flux produced in said core by each reactor winding is in the same direction as the flux produced by said secondary winding and entering said stub portion.

4. The transformer of claim 1 in which said additional stub portion of said core is in the form of an integral extension of one of the elements of said core forming said first portion, which integral extension extends beyond the magnetic loop.

5. The transformer of claim 1 in which said core is formed of four laminated rectangular members joined to form a rectangular loop to form said first portion with one of said rectangular members being substantially longer than the side of said loop of which it is a part so as to extend beyond said loop to form said additional stub portion of said core is in the form of an integral 6. The transformer of claim 3 in which there is a terminal panel means having a first plurality of terminals connected to a plurality of taps of one of said reactor windings and a second plurality of terminals connected to a plurality of taps of the other of said reactor windings and a plurality of taps of said secondary winding.

(References on following page)

References Cited
UNITED STATES PATENTS

| | | | |
|---|---|---|---|
| 1,749,388 | 3/1930 | Meyenhans | 336—170 |
| 2,286,727 | 6/1942 | Grober | 323—43.5 |
| 2,292,514 | 8/1942 | Garlick | 336—155 |
| 2,620,459 | 12/1952 | Sawyer et al. | 336—155 X |
| 2,848,698 | 8/1958 | Howey et al. | 336—212 X |

LEWIS H. MYERS, *Primary Examiner.*

T. J. KOZMA, *Assistant Examiner.*